United States Patent
Song et al.

(10) Patent No.: US 10,755,237 B2
(45) Date of Patent: Aug. 25, 2020

(54) METHOD FOR CREATING, REGISTERING, REVOKING AUTHENTICATION INFORMATION AND SERVER USING THE SAME

(71) Applicant: Coinplug, Inc., Gyeonggi-do (KR)

(72) Inventors: Joo Han Song, Gyeonggi-do (KR); Jay Wu Hong, Seoul (KR); Joon Sun Uhr, Gyeonggi-do (KR)

(73) Assignee: Coinplug, Inc., Gyeonggi-do (KR)

( * ) Notice: Subject to any disclaimer, the term of this patent is extended or adjusted under 35 U.S.C. 154(b) by 526 days.

(21) Appl. No.: 15/488,719

(22) Filed: Apr. 17, 2017

(65) Prior Publication Data

US 2017/0302460 A1 Oct. 19, 2017

(30) Foreign Application Priority Data

Apr. 19, 2016 (KR) ........................ 10-2016-0047849

(51) Int. Cl.
*G06Q 20/02* (2012.01)
*H04L 9/32* (2006.01)
(Continued)

(52) U.S. Cl.
CPC ......... *G06Q 20/02* (2013.01); *G06Q 20/3829* (2013.01); *H04L 9/3263* (2013.01);
(Continued)

(58) Field of Classification Search
CPC .. G06Q 20/3821; G06Q 20/02; H04L 9/3268; H04L 9/2363; H04L 63/0861; H04L 63/061; H04L 63/0442
See application file for complete search history.

(56) References Cited

U.S. PATENT DOCUMENTS 6,446,206 B1 * 9/2002 Feldbaum ........... H04L 63/0823
713/170
7,123,722 B2 * 10/2006 Filipi-Martin ...... H04L 63/0442
380/279
(Continued)

FOREIGN PATENT DOCUMENTS

KR 10-2006-0063664 6/2006
KR 10-0911985 8/2009

OTHER PUBLICATIONS

Allen et. al, "Decentralized Public Key Infrastructure", 2015.*
Fromknecht et. al, "A Decentralized Public Key Infrastructure with Identity Retention", Nov. 11, 2014.*

*Primary Examiner* — Steven S Kim
(74) *Attorney, Agent, or Firm* — Husch Blackwell LLP

(57) ABSTRACT

A method for creating and registering authentication information is provided. The method includes steps of: (a) an intermediate server determining whether a specific user's public key is registered if (i) the specific user's public key and (ii) a hash value of the specific user's information or its processed value are acquired from a biometric authentication server which received a request for registration; (b) the intermediate server, if the specific user's public key is unregistered, creating and transmitting to a database a transaction whose outputs include (i) the specific user's public key and (ii) the hash value or its processed value (c) the intermediate server acquiring a transaction ID representing location information indicating where the transaction is stored in the database; and (d) the intermediate server notifying the biometric authentication server of a successful registration of (i) the specific user's public key and (ii) the hash value or its processed value.

14 Claims, 5 Drawing Sheets

(51) Int. Cl.
*H04L 29/06* (2006.01)
*G06Q 20/38* (2012.01)

(52) U.S. Cl.
CPC ........ *H04L 9/3268* (2013.01); *H04L 63/0861* (2013.01); *G06Q 2220/10* (2013.01); *H04L 2209/56* (2013.01)

(56) References Cited

U.S. PATENT DOCUMENTS

| | | | | |
|---|---|---|---|---|
| 7,370,027 B2* | 5/2008 | Sakurazawa | ........... | G06Q 40/02 707/621 |
| 9,444,693 B2* | 9/2016 | Takazawa | ............... | H04L 41/08 |
| 9,635,000 B1* | 4/2017 | Muftic | ............... | H04L 63/0435 |
| 2001/0032310 A1* | 10/2001 | Corella | ................... | H04L 9/002 713/156 |
| 2002/0124190 A1* | 9/2002 | Siegel | ................ | H04L 63/0861 726/3 |
| 2002/0131601 A1* | 9/2002 | Ninomiya | ............. | H04L 9/0822 380/277 |
| 2002/0198846 A1* | 12/2002 | Lao | ........................ | G06F 21/10 705/54 |
| 2003/0154405 A1* | 8/2003 | Harrison | .............. | G06Q 20/341 726/9 |
| 2003/0173408 A1* | 9/2003 | Mosher, Jr. | ............ | G06K 19/04 235/492 |
| 2005/0065799 A1* | 3/2005 | Dare | .................... | G06F 21/6245 705/50 |
| 2006/0026042 A1* | 2/2006 | Awaraji | ................ | G06F 19/328 705/3 |
| 2006/0248348 A1* | 11/2006 | Wakao | ............... | H04N 1/32101 713/186 |
| 2008/0072063 A1* | 3/2008 | Takahashi | ............. | H04L 9/0866 713/186 |
| 2009/0070350 A1* | 3/2009 | Wang | ................ | G06F 16/24573 |
| 2013/0185214 A1* | 7/2013 | Azen | .................... | G06Q 20/206 705/76 |
| 2015/0244690 A1* | 8/2015 | Mossbarger | .......... | H04L 63/061 713/171 |
| 2015/0269570 A1 | 9/2015 | Phan et al. | | |
| 2016/0283920 A1* | 9/2016 | Fisher | .................... | G06Q 20/02 |
| 2016/0300223 A1* | 10/2016 | Grey | ................. | G06Q 20/3825 |
| 2016/0328713 A1* | 11/2016 | Ebrahimi | ............. | H04L 9/3066 |
| 2016/0342976 A1* | 11/2016 | Davis | ................... | G06Q 20/065 |
| 2017/0012943 A1* | 1/2017 | Kaliski, Jr. | ......... | H04L 63/0428 |
| 2017/0289111 A1* | 10/2017 | Voell | ................... | H04L 63/0435 |
| 2017/0300898 A1* | 10/2017 | Campero | ............. | H04L 9/3236 |
| 2018/0227293 A1* | 8/2018 | Uhr | ....................... | G06Q 20/36 |

* cited by examiner

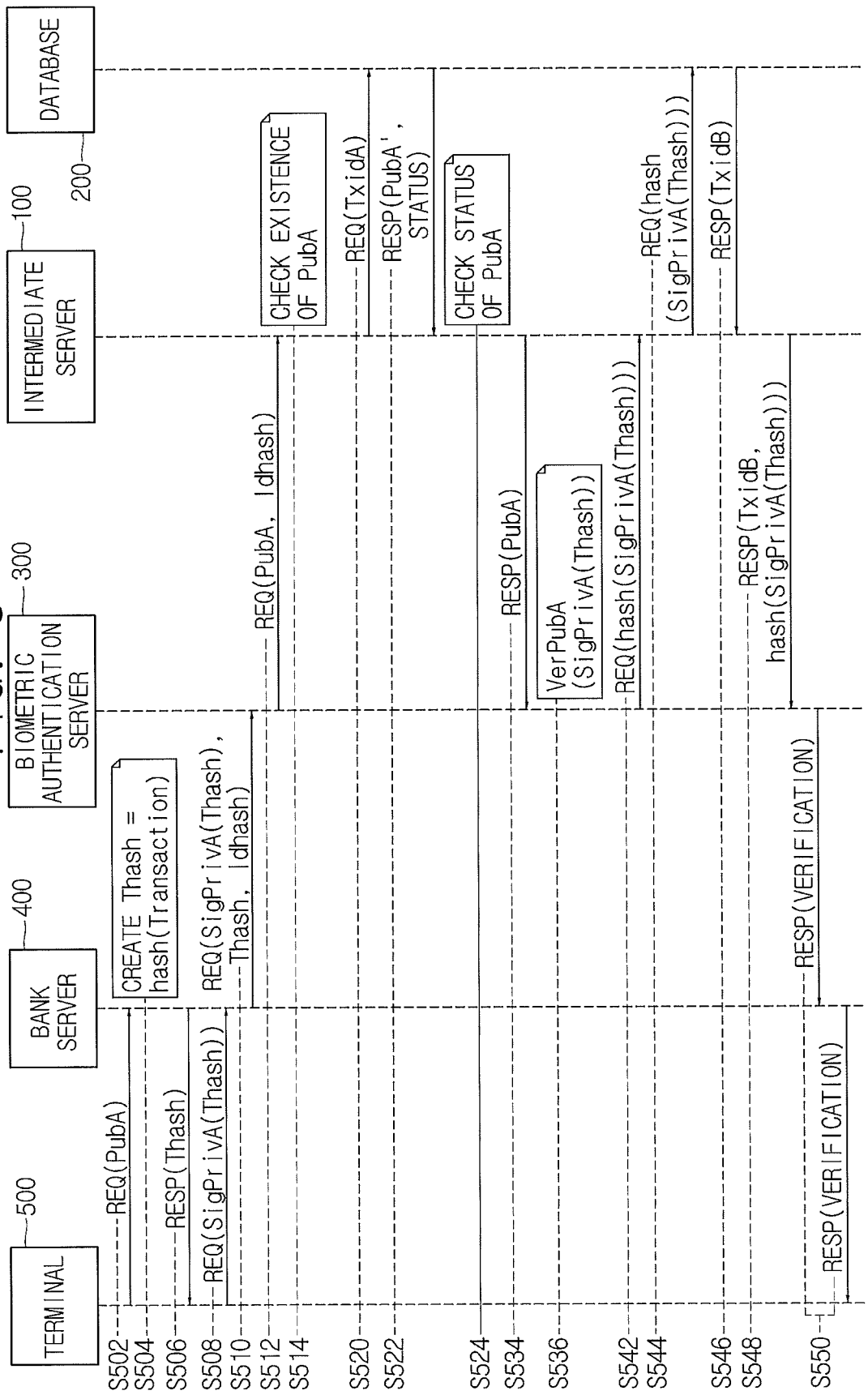

METHOD FOR CREATING, REGISTERING, REVOKING AUTHENTICATION INFORMATION AND SERVER USING THE SAME

CROSS REFERENCE TO RELATED APPLICATION

This application claims priority to and incorporates herein by reference all disclosure in Korean Patent Application No. 10-2016-0047849 filed Apr. 19, 2016.

FIELD OF THE INVENTION

The present invention relates to a method for creating, registering, and revoking authentication information and an intermediate server using the same, and more particularly, to the method and the intermediate server for performing: (1) a process for creating and registering the authentication information under which the intermediate server determines whether or not a public key is registered if the specific user's public key and a hash value of the specific user's information or its processed value are acquired from a biometric authentication server that received a request for registration of authentication information, creates and transmits to a database a transaction whose outputs include the public key of the specific user and the hash value or its processed value if the public key is determined to be unregistered, acquires a transaction ID representing location information indicating where the transaction is stored in the database, and delivers to the biometric authentication server a message notifying a successful registration of the public key and the hash value or its processed value and (2) a process for revoking the authentication information under which the intermediate server determines whether or not a public key is registered if a specific user's public key is acquired from a biometric authentication server that received a request for revocation of authentication information, acquires from a database outputs of a specific transaction corresponding to a transaction ID by referring to the transaction ID corresponding to the public key if the public key is determined to be registered, creates and transmits to the database a new transaction that has at least part of the outputs as its inputs, acquires a transaction ID representing location information indicating where the new transaction is stored in the database, and notifies the biometric authentication server of the revocation of the authentication information.

BACKGROUND OF THE INVENTION

A biometric authentication technology is a technology used for authentication by utilizing unique personal information on biometric traits like fingerprints, irises, faces, and voices. The biometric authentication technology is secure and easy to use as it uses unique biometric information and, recently, a user authentication technology which is combined with biometric authentication technologies like FIDO (Fast Identity Online) has become popular.

Recently, a blockchain technology of virtual currency is popular in a financial industry where a high level of security is needed, because forgery and falsification of description of transactions recorded in the blockchain are impossible.

The present inventor has invented a technology that can create authentication information based on a Public Key Infrastructure (PKI) and that can register and manage the information in the blockchain for secure financial transactions, by integrating a blockchain technology into the biometric authentication technology.

SUMMARY OF THE INVENTION

It is an object of the present invention to solve all the problems as stated above.

It is another object of the present invention to provide a technology that can create authentication information based on a Public Key Infrastructure (PKI) and that can register and manage the information in the blockchain, by combining a blockchain technology with a biometric authentication technology.

It is still another object of the present invention to create the authentication information and register the created authentication information with a blockchain, if there is a request for registration and if a specific user's public key received from a biometric authentication server is determined to be unregistered.

It is still yet another object of the present invention to create revocation information and register the created revocation transaction with the blockchain to thereby revoke the authentication information, if there is a request for revoking the registration and if the specific user's public key received from a biometric authentication server is determined to be registered.

In accordance with one aspect of the present invention, there is provided a method for creating and registering authentication information, including steps of: (a) an intermediate server determining whether or not a specific user's public key is registered if (i) the specific user's public key and (ii) a hash value of the specific user's information or its processed value are acquired from a biometric authentication server which received a request for registration of authentication information; (b) the intermediate server, if the specific user's public key is determined to be unregistered, creating and transmitting to a database a transaction whose outputs include (i) the specific user's public key and (ii) the hash value or its processed value (c) the intermediate server acquiring a transaction ID representing location information indicating where the transaction is stored in the database; and (d) the intermediate server delivering to the biometric authentication server a message notifying a successful registration of (i) the specific user's public key and (ii) the hash value or its processed value.

In accordance with another aspect of the present invention, there is provided a method for revoking authentication information, including steps of: (a) an intermediate server determining whether or not a public key is registered if a specific user's public key is acquired from a biometric authentication server which received a request for revocation of authentication information; (b) the intermediate server, if the public key is determined to be registered, acquiring from a database outputs of a specific transaction corresponding to a transaction ID by referring to the transaction ID corresponding to the specific user's public key; (c) the intermediate server creating and transmitting to the database a new transaction which has at least part of the outputs as its inputs; (d) the intermediate server acquiring a transaction ID representing location information indicating where the new transaction is stored in the database; and (e) the intermediate server notifying the biometric authentication server of the revocation of the authentication information.

In accordance with still another aspect of the present invention, there is provided a server for creating and registering authentication information, including: a processor for determining whether or not a specific user's public key is registered if (i) the specific user's public key and (ii) a hash value of the specific user's information or its processed value are acquired from a biometric authentication server which received a request for registration of authentication information; and a communication part for creating and transmitting to a database a transaction whose outputs include (i) the specific user's public key and (ii) the hash value or its processed value if the specific user's public key is determined to be unregistered, acquiring a transaction ID representing location information indicating where the transaction is stored in the database, and delivering to the biometric authentication server a message notifying a successful registration of (i) the specific user's public key and (ii) the hash value or its processed value.

In accordance with still yet another aspect of the present invention, there is provided a server for revoking authentication information, including: a processor for determining whether or not a specific user's public key is registered if the specific user's public key is acquired from a biometric authentication server which received a request for revocation of authentication information; and a communication part for acquiring from a database outputs of a specific transaction corresponding to a transaction ID by referring to the transaction ID corresponding to the specific user's public key if the specific user's public key is determined to be registered, creating and transmitting to the database a new transaction which has at least part of the outputs as its inputs, acquiring a transaction ID representing location information indicating where the new transaction is stored in the database, and notifying the biometric authentication server of the revocation of the authentication information.

BRIEF DESCRIPTION OF THE DRAWINGS

The above and other objects and features of the present invention will become apparent from the following description of preferred embodiments given in conjunction with the accompanying drawings, in which:

FIG. 5 is a sequence diagram illustrating a process of using the authentication information at the time of a transaction in accordance with still another example embodiment of the present invention.

DETAILED DESCRIPTION OF THE PREFERRED EMBODIMENTS

Figure 1:
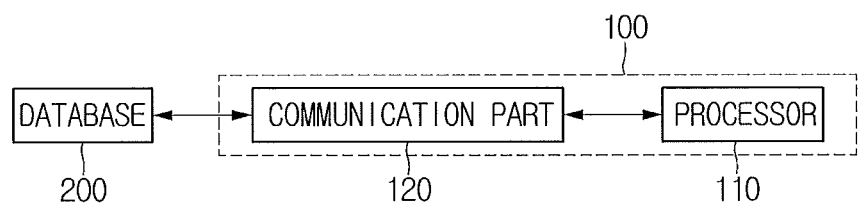
FIG. 1 is a block diagram representing a configuration of an intermediate server that creates and registers authentication information in accordance with one example embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 2:
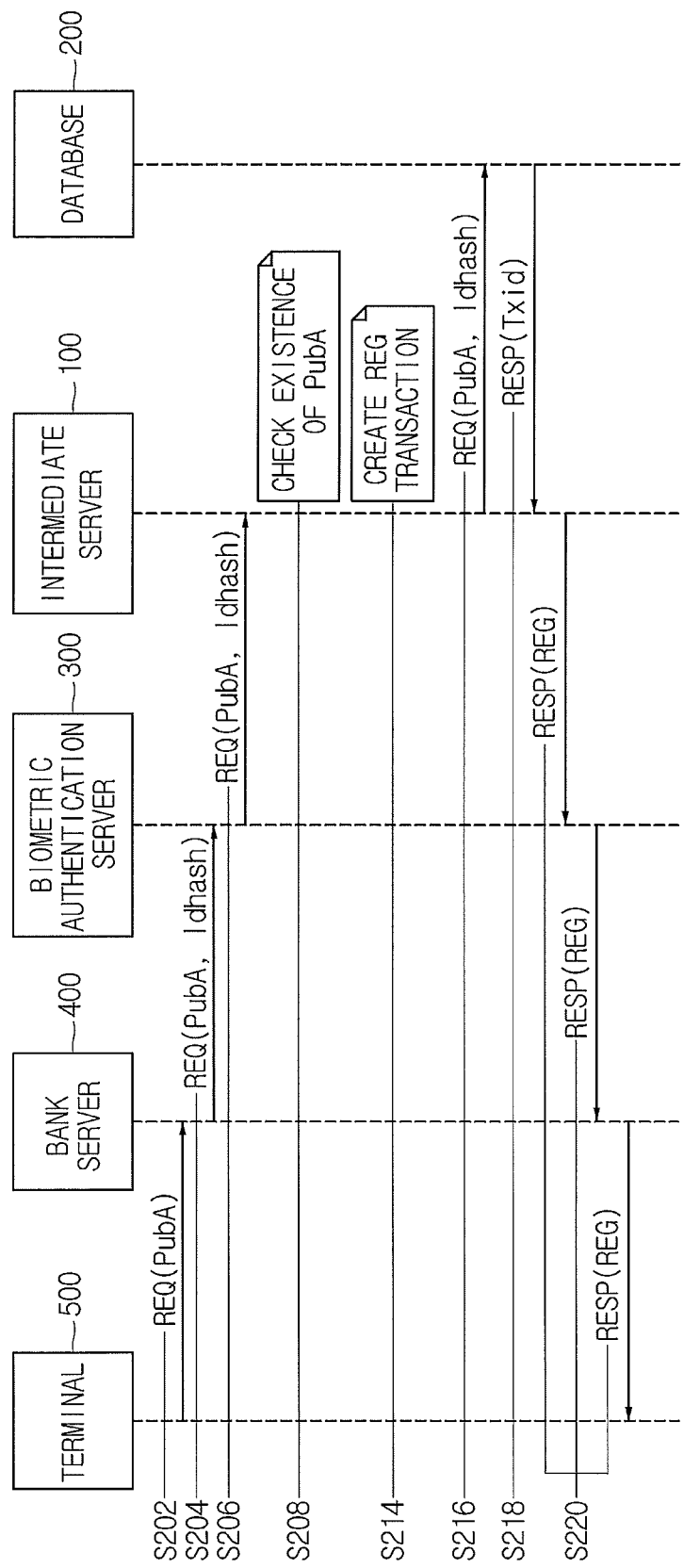
FIG. 2 is a sequence diagram illustrating a course of creation and registration of the authentication information in accordance with one example embodiment of the present invention.

FIG. 1 is a block diagram illustrating a configuration of an intermediate server that creates and registers authentication information in accordance with one example embodiment of the present invention and FIG. 2 is a sequence diagram illustrating a process of creation and registration of the authentication information in accordance with one example embodiment of the present invention.

By referring to FIG. 1, the intermediate server 100 that creates and registers the authentication information includes a processor 110 and a communication part 120 in accordance with one example embodiment of the present invention.

If (i) a specific user's public key and (ii) a hash value of the specific user's information or its processed value are acquired from a biometric authentication server 300 which received a request for registration of authentication information from a bank server 400, the processor 110 may determine whether or not the specific user's public key is registered. The biometric authentication server 300 may be a device that performs authentication of a user. For example, the biometric authentication server 300 may include a FIDO server.

By referring to FIG. 2, a terminal 500 creates the specific user's public key and transmits it to the bank server 400 at a step of S202. Herein, a private key may also be created. The specific user may register the specific user's information with a bank in advance, and this may support the authentication of the specific user. As an example, if a hash value of the specific user's information and the specific user's public key are acquired, and if the acquired hash value matches a hash value of the specific user's information in the bank server 400, the authentication of the specific user may be achieved. Herein, the specific user's information may be information that can identify the user, which includes at least part of the specific user's name N, a birth date B, a mobile phone number #, and an email address E. If the specific user is authenticated, the bank server 400 may transmit a Uhash which is a hash value of the specific user's information to the biometric authentication server 300 at a step of S204. Herein, the specific user's public key may also be transmitted. If a user id is created by using the Uhash, the Idhash which is a hash value of the Uhash and the user id may be transmitted instead of the Uhash. The Idhash may be an SHA256 hash. The biometric authentication server 300 may transmit (i) the specific user's public key and (ii) the Uhash, as a hash value of the specific user's information, or a processed value of the Uhash to the intermediate server 100 at a step of S206. In this case, if the user id is created by using the Uhash, the processed value of the Uhash may be the Idhash which is a hash value of the Uhash and the user id. If (i) the specific user's public key and (ii) the hash value of the specific user's information or its processed value are acquired, the processor 110 may determine whether the specific user's public key is registered with a local database (not illustrated) at a step of S208. For reference, the terminal 500 may be a terminal device that can process the user's input and output, and may be one of a smart phone, a PC, a tablet PC and other electronic devices capable of handling the user's input and output.

The communication part 120 may communicate with the biometric authentication server 300 or a database 200. Herein, the database 200 may be a blockchain of virtual currency.

If the specific user's public key is determined to be registered at a step of S210 (not illustrated), since this means the authentication information is already registered, the communication part 120 may transmit an error message to the biometric authentication server 300 at a step of S212 (not illustrated). The error message is transmitted through the bank server 400 to the terminal 500.

At steps of S214 and S216, if the specific user's public key is determined to be unregistered, a transaction whose output includes (i) the specific user's public key and (ii) the hash value or its processed value may be created and transmitted to the database. Specifically, if the specific user's public key is determined to be unregistered, the communication part 120 may create a transaction including an output1 having (i) the specific user's public key and (ii) the hash value or its processed value (op_msg1=pubkey:IDhash) and an output2 having a certain amount of virtual currency and transmit the created transaction to the database. The output2 may be used for revocation of the authentication information, as follows. The revocation of the authentication information may be performed by creating a new transaction, with the output2 as its input, and transmitting the new transaction to the database 200.

Further, the communication part 120 may acquire a transaction ID representing location information on where the transaction is recorded in the database 200 at a step of S218 and may transmit a notifying message to the biometric authentication server 300 that (i) the specific user's public key and (ii) the hash value or its processed value are successfully registered at a step of S220. The notifying message may be transmitted through the bank server 400 to the terminal 500.

The communication part 120 may be implemented by various communication technologies. In other words, WIFI, WCDMA (Wideband CDMA), HSDPA (High Speed Downlink Packet Access), HSUPA (High Speed Uplink Packet Access), HSPA (High Speed Packet Access), Mobile WiMAX, WiBro, LTE (Long Term Evolution), Bluetooth, IrDA (infrared data association), NFC (Near Field Communication), Zigbee or wireless LAN may be used. Further, if the service is provided via the Internet, TCP/IP which is a standard protocol for transmission of data on the Internet may be adopted.

The processor 110 may store the transaction ID, the hash value of the specific user's information or its processed value and the specific user's public key in the local database (not illustrated).

The processor 110 may control a data flow among a communication part 120 and other components. In other words, the processor 110 may control the communication part 120 and other components to perform their unique functions, by controlling the data flow among each component within the intermediate server 100.

The processor 110 may include hardware configuration of MPU (Micro Processing Unit) or CPU (Central Processing Unit), cache memory, data bus, etc. Additionally, OS and software configuration of applications that achieve specific purposes may be further included.

Configuration and operation of the intermediate server 100 which performs the revocation of the authentication information are explained as follows. An intermediate server which performs the revocation of the authentication information to be explained hereinafter may be a different device from the aforementioned intermediate server 100, however, they are considered to be identical for convenience of explanation.

Figure 3:
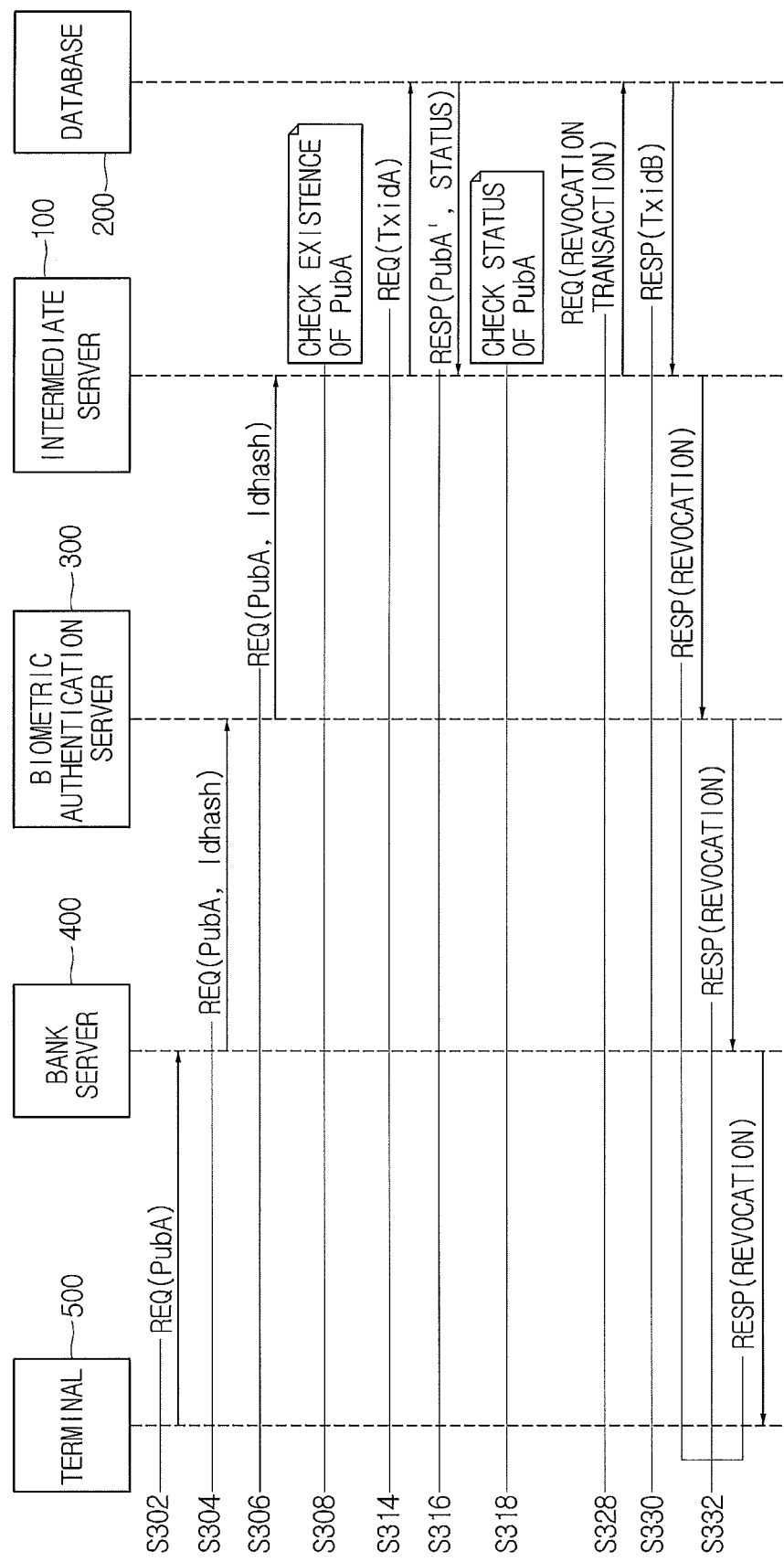
FIG. 3 is a sequence diagram illustrating a process of revocation of the authentication information in accordance with one example embodiment of the present invention.

FIG. 3 is a sequence diagram illustrating a process of revocation of the authentication information in accordance with one example embodiment of the present invention.

If the specific user's public key is acquired from the biometric authentication server 300 which received a request for revoking the authentication information from a bank server 400 like in the above-described process of creation and registration of the authentication information, the processor 110 may determine whether or not the specific user's public key is registered at a step of S308. A process prior to determining whether or not the specific user's public key is registered is performed similarly to the process of creation and registration of the authentication information.

First of all, the terminal 500 may transmit the specific user's public key to the bank server 400 a step of S302. If multiple users' public keys are stored in the terminal 500, a public key selected by a user may be transmitted to the bank server 400. Further, the public key may be selected by inputting biometric information like fingerprint information, face information, and iris information. The bank server 400 may perform authentication of the specific user. If the specific user is authenticated, the bank server 400 may transmit the Uhash which is a hash value of the specific user's information to the biometric authentication server 300 at a step of S304. Herein, the specific user's public key may also be transmitted. Clearly, the Idhash may be transmitted instead of the Uhash, as aforementioned. The biometric authentication server 300 may transmit (i) the specific user's public key and (ii) the Uhash or its processed value as the hash value of the specific user information or its processed value to the intermediate server 100, at a step of S306. Similarly, in this case, the processed value of the Uhash may be the Idhash. If (i) the specific user's public key and (ii) the hash value of the specific user's information or its processed value are acquired, the processor 110 may determine whether or not the specific user's public key is registered with the local database, at a step of S308.

If the specific user's public key is determined to be unregistered, since this means the authentication information is not registered, the communication part 120 may transmit an error message, at a step of S312 (not illustrated). The error message may be transmitted through the bank server 400 to the terminal 500.

If the specific user's public key is determined to be registered, the communication part 120 may acquire an output of a specific transaction corresponding to the transaction ID from the database 200 by using the transaction ID corresponding to the specific user's public key at steps of S314 and S316 and then if a new transaction whose input includes at least part of the above-described output is created, the communication part 120 may transmit the new transaction to the database 200, at a step of S328. Specifically, the processor 110 may allow an unsigned transaction whose input includes the at least part of the output which is a certain amount of virtual currency to be created, and may allow the unsigned transaction to be signed with a private key of the intermediate server 100, to thereby create a signed transaction and accordingly create the new transaction. The communication part 120 may acquire the transaction ID representing the location information on where the new transaction is recorded in the database 200 at a step of S330 and may notify the biometric authentication server 300 of a fact that the authentication information has been revoked at a step of S332. The notifying message may be transmitted through the bank server 400 to the terminal 500.

However, before performing this process, the communication part 120 may examine state information of the authentication information and may transmit the error message. In other words, if the specific user's public key is determined to be registered, the communication part 120 may acquire the specific user's public key and the state information of the authentication information as the output of the specific transaction corresponding to the transaction ID from the database 200 by using the transaction ID corresponding to the specific user's public key at a step of S316, and if the public key acquired from the database 200 does not match the specific user's public key acquired from the biometric authentication server 300 at s step of S320 (not illustrated) or the authentication information is determined to be in a certain state by referring to the state information of the authentication information at a step of S324 (not illustrated), the communication part 120 may transmit the error message to the biometric authentication server 300 at steps of S322 (not illustrated) and S326 (not illustrated). The error message may be transmitted through the bank server 400 to the terminal 500. The certain state may include a revocation state or a state satisfying a certain condition of a contract.

Hereinafter, configuration and operation of the intermediate server using the authentication information are explained. The intermediate server explained hereinafter may be a different device from the aforementioned intermediate server 100, however, they are considered to be identical for convenience of explanation.

Figure 4:
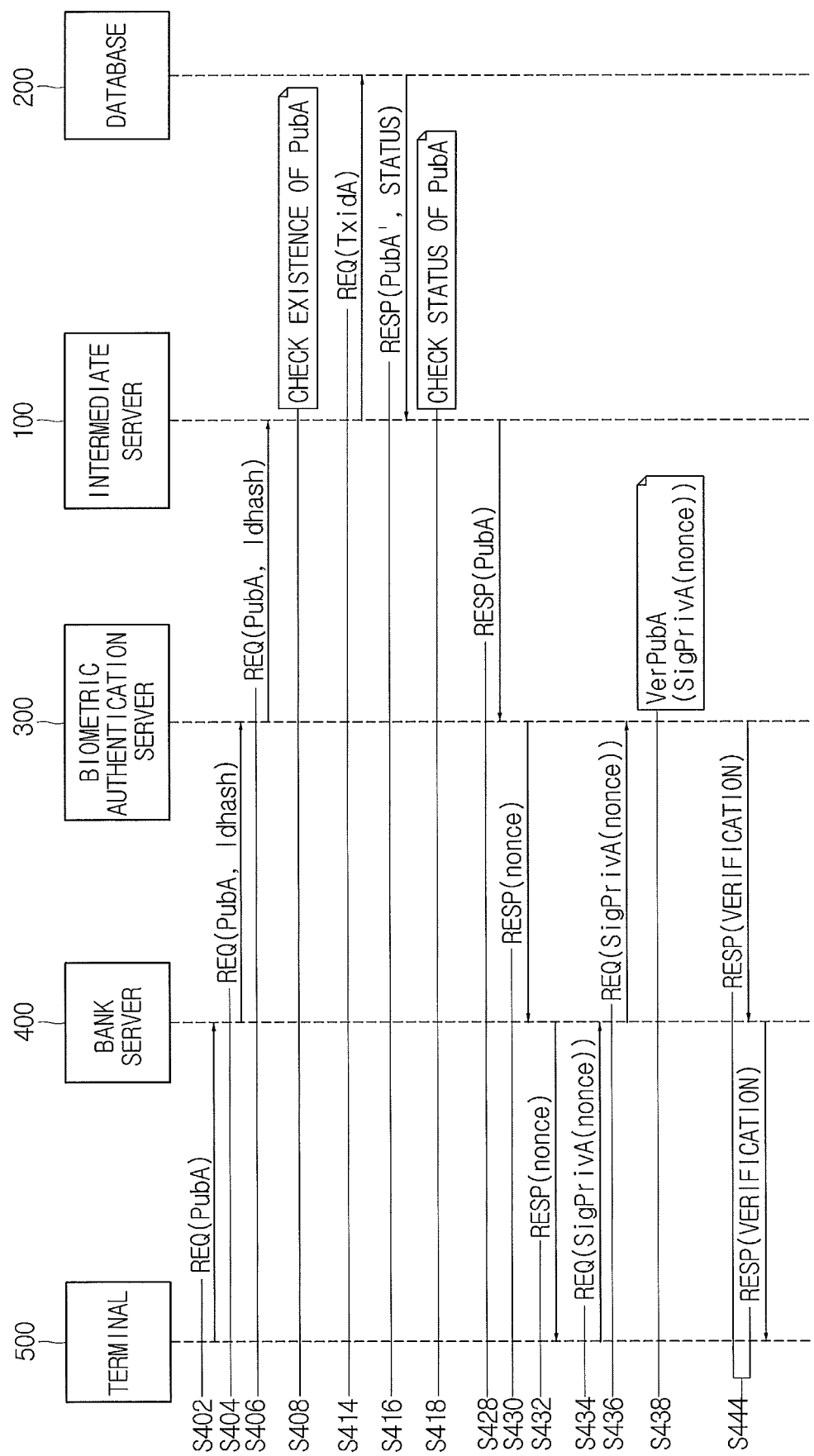
FIG. 4 is a sequence diagram illustrating a process of using the authentication information at the time of login in accordance with another example embodiment of the present invention.

FIG. 4 is a sequence diagram illustrating a process of using the authentication information at the time of login in accordance with another example embodiment of the present invention.

By referring to FIG. 4, if the specific user's public key is acquired from the biometric authentication server 300 which received a request for using the authentication information from the bank server 400, the processor 110 may determine whether or not the specific user's public key is registered, at a step of S408.

As processes performed before determining whether or not the specific user's public key is registered are similar to the processes of creating, registering, revoking the authentication information, detailed explanation thereon is omitted.

If the specific user's public key is determined to be unregistered at a step of S410 (not illustrated), since it means that the authentication information is not available, the communication part 120 may transmit an error message to the biometric authentication server 300 at a step of S412 (not illustrated). In this case, the biometric authentication server 300 may transmit the error message to the bank server 400 and the bank server 400 may transmit the error message to the terminal 500.

If the specific user's public key is determined to be registered, the communication part 120 may transmit the specific user's public key to the biometric authentication server 300 at a step of S428, or may allow the biometric authentication server 300 to use the specific user's public key managed by itself to thereby allow the biometric authentication server 300 to (i) create a random nonce, (ii) verify a value acquired by signing the created random nonce with a private key corresponding to the specific user's biometric information by using the specific user's public key at a step of S438 and (iii) transmit a message about the verification result to the bank server 400 at a step of S444.

More specifically, if the specific user's public key is determined to be registered, the communication part 120 may transmit the specific user's public key to the biometric authentication server 300 at a step of S428 or may allow the specific user's public key managed in the biometric authentication server 300 to be used by the biometric authentication server 300, and the biometric authentication server 300 may create the random nonce. The biometric authentication server 300 may transmit the created random nonce to the bank server 400 at a step of S430. The bank server 400 may transmit the received random nonce to the terminal 500, at a step of S432. The terminal 500, after receiving the random nonce, may acquire the specific user's biometric information by a process of acquiring, e.g., a fingerprint, and the terminal 500 may sign the random nonce with a private key corresponding to the specific user's biometric information and then may transmit the signed random nonce to the bank server 400, at a step of S434. The bank server 400 may transmit the signed random nonce to the biometric authentication server 300, at a step of S436. The biometric authentication server 300 may verify the signed random nonce by using the specific user's public key, at a step of S438. If the result of verification is a non-match at a step of S440 (not illustrated), the biometric authentication server 300 may transmit a message indicating that the biometric information the specific user inputted is incorrect, at a step of S442 (not illustrated). The message may be transmitted through the bank server 400 to the terminal 500. If the result of verification is a match, the biometric authentication server 300 may transmit a message indicating the verification is successful and may assist in performing a normal login, at a step of S444. For reference, the user's biometric information may be at least part of iris information, fingerprint information and face information.

However, before performing these processes, the communication part 120 may examine the state information of the authentication information and may transmit the error message. In other words, if the specific user's public key is determined to be registered, the communication part 120 may acquire the specific user's public key and the state information of the authentication information as the output of the specific transaction corresponding to the transaction ID from the database 200 by referring to the transaction ID corresponding to the specific user's public key at a step of S416, and if the public key acquired from the database 200 does not match the specific user's public key acquired from the biometric authentication server 300 at s step of S420 (not illustrated) or the authentication information is determined to be in a certain state by referring to the state information of the authentication information at a step of S424 (not illustrated), the communication part 120 may transmit the error message to the biometric authentication server 300 at steps of S422 and S426 (not illustrated). The error message may be transmitted through the bank server 400 to the terminal 500. The state may be a state of revocation or a state satisfying a certain condition of a contract.

FIG. 5 is a sequence diagram illustrating a process of using the authentication information at the time of a transaction in accordance with still another example embodiment of the present invention.

By referring to FIG. 5, if the specific user's public key is acquired from the biometric authentication server 300 which received a request for using the authentication information from the bank server 400, the processor 110 may determine whether or not the specific user's public key is registered, at a step of S514.

As processes performed before determining whether or not the specific user's public key is registered are similar to the processes of creating, registering, revoking the authentication information, detailed explanation thereon is omitted.

If the specific user's public key is determined to be unregistered at a step of S516 (not illustrated), the communication part 120 may transmit to the biometric authentication server 300 an error message indicating that the specific user's public key is not registered, at a step of S518 (not illustrated). The error message may be transmitted through the bank server 400 to the terminal 500.

However, if the specific user's public key is determined to be registered, the communication part 120 may transmit the specific user's public key to the biometric authentication server 300 at a step of S534, or may allow the biometric authentication server 300 to use the specific user's public key managed by itself to thereby allow the biometric authentication server 300 to (i) verify a value acquired by signing a Thash, which is a hash value of the transaction information, or its processed value, with a private key corresponding to the specific user's biometric information by using the specific user's public key at a step of S536, (ii) transmit a message about the verification result to the bank server 400 at steps of S538 (not illustrated) an S540 (not illustrated).

More specifically, the bank server 400 may create the Thash which a hash value of the transaction information or its processed value at a step of S504, and may transmit it to the terminal 500 at a step of S506. Herein, the Thash means hash (Transaction). If the specific user's biometric information is acquired, the terminal 500 may transmit a value A acquired by signing the Thash or its processed value with the private key corresponding to the specific user's biometric information to the bank server 400 at a step of S508. Then, the bank server 400 may transmit the value A to the biometric authentication server 300. Herein, the specific user's public key, Thash, Idhash, etc. may be transmitted together. Clearly, the specific user's public key, Idhash, etc. may be transmitted in advance. In other words, the Thash and the Idhash are transmitted to the biometric authentication server 300 at the same time and the specific user's public key and the Idhash are transmitted from the biometric authentication server 300 to the intermediate server 100 and then whether the specific user's public key is registered may be determined as illustrated in FIG. 5. However, the Thash may be created and transmitted regardless of transmission and registration confirmation of the specific user's public key and transmission of the Idhash.

Meanwhile, if the result of verification is a non-match at a step of S538 (not illustrated), the communication part 120 may transmit a message indicating that the biometric information the specific user inputted is incorrect, at a step of S540 (not illustrated). The notifying message may be transmitted through the bank server 400 to the terminal 500.

However, before performing these processes, the communication part 120 may examine the state information of the authentication information and may transmit the error message. In other words, if the specific user's public key is determined to be registered, the communication part 120 may acquire the specific user's public key and the state information of the authentication information as the output of the specific transaction corresponding to the transaction ID from the database 200 by using the transaction ID corresponding to the specific user's public key at a step of S522, and if the public key acquired from the database 200 does not match the specific user's public key acquired from the biometric authentication server 300 at a step of S526 (not illustrated) or the authentication information is determined to be in a certain state by referring to the state information of the authentication information at a step of S530 (not illustrated), the communication part 120 may transmit the error message to the biometric authentication server 300 at steps of S528 (not illustrated) and S532 (not illustrated). The error message may be transmitted through the bank server 400 to the terminal 500. The state may be a state of revocation or a state satisfying a certain condition of a contract.

The communication part 120 may transmit X1 which is acquired by signing a hash value of the transaction information or its processed value with the private key or X2 which is a hash value of the X1 to thereby allow the X1 or the X2 to be recorded in the database 200, at a step of S544. The purpose of this process is to prevent denial of the transaction.

The communication part 120 may acquire a transaction ID representing location information on where the X1 or the X2 is recorded in the database 200 and may transmit the acquired transaction ID to the biometric authentication server 300, at a step of S548. The transaction ID may be transmitted through the bank server 400 to the terminal 500.

The intermediate server 100 in accordance with various example embodiments of the present invention may provide a technology for creating, registering and managing the authentication information by combining the blockchain technology with the biometric authentication technology.

The present invention has an effect of providing a technology that can create authentication information based on a PKI and that can register and manage the information in the blockchain, by combining a blockchain technology with the biometric authentication technology.

The present invention has another effect of creating the authentication information and registering the created authentication information with the blockchain, if there is a request for registration and if a specific user's public key received from the biometric authentication server is determined to be unregistered.

The present invention has still another effect of creating revocation transaction and registering the created revocation transaction with the blockchain to thereby revoke the authentication information, if there is a request for revoking the registration and if a specific user's public key received from the biometric authentication server is determined to be registered.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high-level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variants equal or equivalent to the patent claims pertain to the category of the thought of the present invention.

What is claimed is:

1. A method for registering authentication information, comprising steps of:
    (a) an intermediate server determining whether or not a specific user's public key is registered in a local database of the intermediate server, said determining performed in response to the intermediate server acquiring (i) the specific user's public key and (ii) a hash value of the specific user's information or a processed value of the hash value from a biometric authentication server, wherein the biometric authentication server received a request for registration of authentication information;
    (b) the intermediate server, in response to determining that the specific user's public key is unregistered in the local database, transmitting to a blockchain a transaction for recording on the blockchain, wherein the transaction includes at least one output having (i) the specific user's public key and (ii) the hash value or the processed value of the hash value;
    (c) the intermediate server acquiring from the blockchain a transaction ID representing location information indicating where the transaction is stored on the blockchain;
    (d) the intermediate server storing the transaction ID and associating the transaction ID to the specific user's public key in the local database in response to acquiring the transaction ID from the blockchain; and
    (e) the intermediate server delivering to the biometric authentication server a message notifying a successful registration of (i) the specific user's public key and (ii) the hash value or the processed value of the hash value, wherein at the step of (a), the biometric authentication server received the request for registration of authentication from a bank server, and wherein the request for registration of authentication includes (i) the specific user's public key, wherein the bank server received the specific user's public key from a terminal and (ii) a Uhash or a processed value of the Uhash, wherein the Uhash is the hash value of the specific user's information.

2. The method of claim 1, wherein the processed value of the Uhash includes an Idhash, wherein the Idhash is a hash value of both the Uhash and a user id.

3. The method of claim 1, wherein, at the step of (a), in response to acquiring the hash value of the specific user's information beside the specific user's public key, authenticating the specific user when the hash value of the specific user's information corresponds to a hash value of the specific user's information stored in the bank server.

4. The method of claim 1, wherein, at the step of (b), the intermediate server transmits to the blockchain a transaction, wherein the transaction includes at least one output having (i) an output1 having (i-1) the specific user's public key and (i-2) the hash value or a processed value of the hash value and (ii) an output2 having an amount of a virtual currency.

5. The method of claim 1, wherein the intermediate server stores in the local database the transaction ID, the hash value of the specific user's information or a processed value of the hash value of the specific user's information or the specific user's public key.

6. The method of claim 1, wherein, at the step of (b), in response to determining the specific user's public key is registered, the intermediate server transmits an error message to the biometric authentication server.

7. The method of claim 1, wherein the specific user's information includes at least part of the specific user's name, birth date, mobile phone number and email address.

8. A server for registering authentication information, comprising:
    a processor programmed for
        determining whether or not a specific user's public key is registered in a local database of the server, said determining performed in response to acquiring by the server (i) the specific user's public key and (ii) a hash value of the specific user's information or a processed value of the hash value from a biometric authentication server, wherein the biometric authentication server received a request for registration of authentication information from a bank server, and wherein the request for registration of authentication information includes (i) the specific user's public key, wherein the bank server received the specific user's public key from a terminal and (ii) a Uhash or a processed value of the Uhash, wherein the Uhash is the hash value of the specific user's information; and
    a tangible communication part configured for
        transmitting to a blockchain a transaction for recording on the blockchain, wherein the transaction includes at least one output having (i) the specific user's public key and (ii) the hash value or the processed value of the hash value in response to determining by the processor the specific user's public key is unregistered in the local database,
        acquiring from the blockchain a transaction ID representing location information indicating where the transaction is stored on the blockchain, and
        delivering to the biometric authentication server a message notifying a successful registration of (i) the specific user's public key and (ii) the hash value or the processed value of the hash value;
    wherein the processor is further programmed to store the transaction ID and associate the transaction ID to the specific user's public key in the local database in response to acquiring the transaction ID from the blockchain.

9. The server of claim 8, wherein the processed value of the Uhash includes an Idhash, wherein the Idhash is a hash value of both the Uhash and a user id.

10. The server of claim 8, wherein, in response to acquiring the hash value of the specific user's information beside the specific user's public key, authenticating the specific user when the hash value of the specific user's information corresponds to a hash value of the specific user's information stored in the bank server.

11. The server of claim 8, wherein the communication part transmits to the blockchain a transaction, wherein the transaction includes at least one output having (i) an output1 having (i-1) the specific user's public key and (i-2) the hash value or a processed value of the hash value and (ii) an output2 having an amount of a virtual currency.

12. The server of claim 8, wherein the processor stores in the local database the transaction ID, the hash value of the specific user's information or a processed value of the hash value of the specific user's information or the specific user's public key.

13. The server of claim 8, wherein, in response to determining the specific user's public key is registered, the communication part transmits an error message to the biometric authentication server.

14. The server of claim 8, wherein the specific user's information includes at least part of the specific user's name, birth date, mobile phone number and email address.

* * * * *